United States Patent [19]
Young

[11] 3,876,535
[45] Apr. 8, 1975

[54] HYDROGEN SULFIDE REMOVAL FROM WASTE FLUID

[75] Inventor: Kai-Wing Young, Williamsville, N.Y.

[73] Assignee: Union Carbide Corporation, New York, N.Y.

[22] Filed: Apr. 26, 1974

[21] Appl. No.: 464,437

[52] U.S. Cl. .................. 210/5; 210/8; 210/9; 210/63
[51] Int. Cl. .................................. C02c 1/02
[58] Field of Search .................. 210/2–4, 5, 210/7, 8, 9, 14, 15, 16, 17, 60, 63; 55/46, 73; 423/220, 224

[56] References Cited
UNITED STATES PATENTS

| | | |
|---|---|---|
| 2,097,454 | 11/1937 | Fischer .................. 55/73 X |
| 2,200,580 | 5/1940 | Pruss et al. .................. 210/17 |
| 3,388,057 | 6/1968 | Callahan .................. 210/16 X |
| 3,547,815 | 12/1970 | McWhirter .................. 210/7 |
| 3,658,697 | 4/1972 | Huether .................. 210/18 |
| 3,672,836 | 6/1972 | Brown .................. 210/63 X |

Primary Examiner—Thomas G. Wyse
Attorney, Agent, or Firm—John C. Lefever

[57] ABSTRACT

A method for removing hydrogen sulfide from both gas and liquid phases of septic sewage by absorbing $H_2S$ in the influent sewer gas into a minor water stream and thereafter mixing the $H_2S$-containing water, the sewer water and activated sludge with oxygen gas to chemically oxidize the $H_2S$ and biochemically oxidize the BOD.

13 Claims, 2 Drawing Figures

HYDROGEN SULFIDE REMOVAL FROM WASTE FLUID

BACKGROUND OF THE INVENTION

This invention relates to a method for removing hydrogen sulfide from both gas and liquid phases of aqueous BOD-containing waste fluid, as for example septic sewage.

All wastewater contains sulfates in varying degrees. The development of septic sewage, more prone to occur in warm climates, results in the bacterial reduction of the sulfates to sulfide with the evolution of hydrogen sulfide gas as well as dissolved hydrogen sulfide. Gaseous hydrogen sulfide is a public nuisance because of its highly disagreeable odor at levels as low as one part per million. In solution, hydrogen sulfide has a detrimental effect on water quality. It not only exerts a demand on dissolved oxygen, but has been shown to be quite toxic at low concentrations to fish, crustaceans, polychaetes, and many microorganisms. For these reasons, it is desirable to remove or minimize the presence of hydrogen sulfide in the wastewater treatment plant.

The problems attending generation of hydrogen sulfide in septic sewage and wastewater are well-known. In the prior art, several methods are demonstrated for sulfide removal or reduction, but all are characterizable by certain deficiencies in scope of treatment, in operational efficiency, or in simplicity and economy of design.

Hydrogen sulfide is commonly formed in sludge digester tanks, in which anaerobic bacterial decomposition of concentrated waste solids takes place.

In U.S. Pat. No. 2,097,454, hydrogen sulfide's high solubility in water is utilized by mixing the digester gas with raw sewage or primary clarifier effluent. Hydrogen sulfide is absorbed from the gas phase along with some of the gaseous carbon dioxide present. The resulting hydrogen sulfide-laden stream comprises the effluent from the process which unfortunately discharges a water stream of poor quality which may re-release gaseous hydrogen sulfide, provide an increased loading on the dissolved oxygen content, and adversely affect aquatic life.

U.S. Pat. No. 3,383,057 describes a method of reducing hydrogen sulfide in digester gas by direct injection of oxygen or air into the aqueous sulfide-containing sewage sludge. The amount of oxygen added is based on the chemical equation $2H_2S + O_2 \rightarrow 2S + 2H_2O$, and additions of from one up to four times the stoichiometric requirement are described. The upper limit derives from the assumption that only 25% of the oxygen combines with hydrogen sulfide. Accordingly, the patent examples and test results show oxygen injection at the upper limit, but even at this high rate of addition, the average reduction in hydrogen sulfide is only 77.7%, at an oxygen efficiency of 17.6%. The unutilized oxygen is combinable with other material in the digestion system of passes through the system without being absorbed, according to the patent. If oxygen combines chemically with the organic sludge material, release of carbon dioxide with resulting dilution of the fuel gas may occur. If oxygen passes through the system without absorption, a hazardously combustible product gas may be formed.

The prior art, as typified by the aforedescribed processes, does not provide a wholly satisfactory method for hydrogen sulfide removal. Particularly lacking is a means of removing gaseous hydrogen sulfide from gases evolved from influent sewage flows prior to a waste water treatment process. Typical measurements show appreciable concentrations of hydrogen sulfide in raw sewage, especially in warmer climates. The undesirability of allowing even small quantities of this sulfide concentration to pass into the atmosphere has already been discussed, and is acutely pertinent in areas where legislative constraints on air quality exist.

An object of this invention is to provide an improved method for removing hydrogen sulfide ($H_2S$) from both gas and liquid phases of aqueous BOD-containing waste fluid. Another object is to provide such a method requiring no chemical additives or adsorptive media, which operates at ambient conditions and yields effluent (both liquid and gas) essentially free of hydrogen sulfide.

SUMMARY

This invention relates to a method for removing $H_2S$ from both gas and liquid phases of aqueous BOD-containing waste fluid.

In this method the $H_2S$-containing waste fluid such as septic municipal sewage is first separated into wastewater and waste gas, both containing $H_2S$. The separated $H_2S$-containing waste gas is contacted with $H_2S$-low water in a liquid/gas flow ratio of at least 545 lb. moles liquid/lb. mole gas for $H_2S$ absorption. The $H_2S$-depleted gas is discharged as for example to the atmosphere. The $H_2S$-containing wastewater and $H_2S$ containing water are mixed with activated sludge and at least 50% by volume oxygen gas in sufficient quantity to provide dissolved oxygen concentration of at least 2 ppm. in an enclosed aeration zone. One fluid is simultaneously recirculated against the other fluid in the enclosed aeration zone for sufficient duration to oxidize the $H_2S$ and also oxidize the biochemical oxygen demand (BOD) of the wastewater, thereby forming oxygenated liquor. The latter is separated into activated sludge and purified water, and at least part of the activated sludge is recycled to the enclosed aeration zone.

The invention realizes the aforestated objects, and is capable of processing septic municipal sewage into $H_2S$-free waste gas and $H_2S$ and BOD-depleted effluent water.

DESCRIPTION OF PREFERRED EMBODIMENTS

Figure 1:
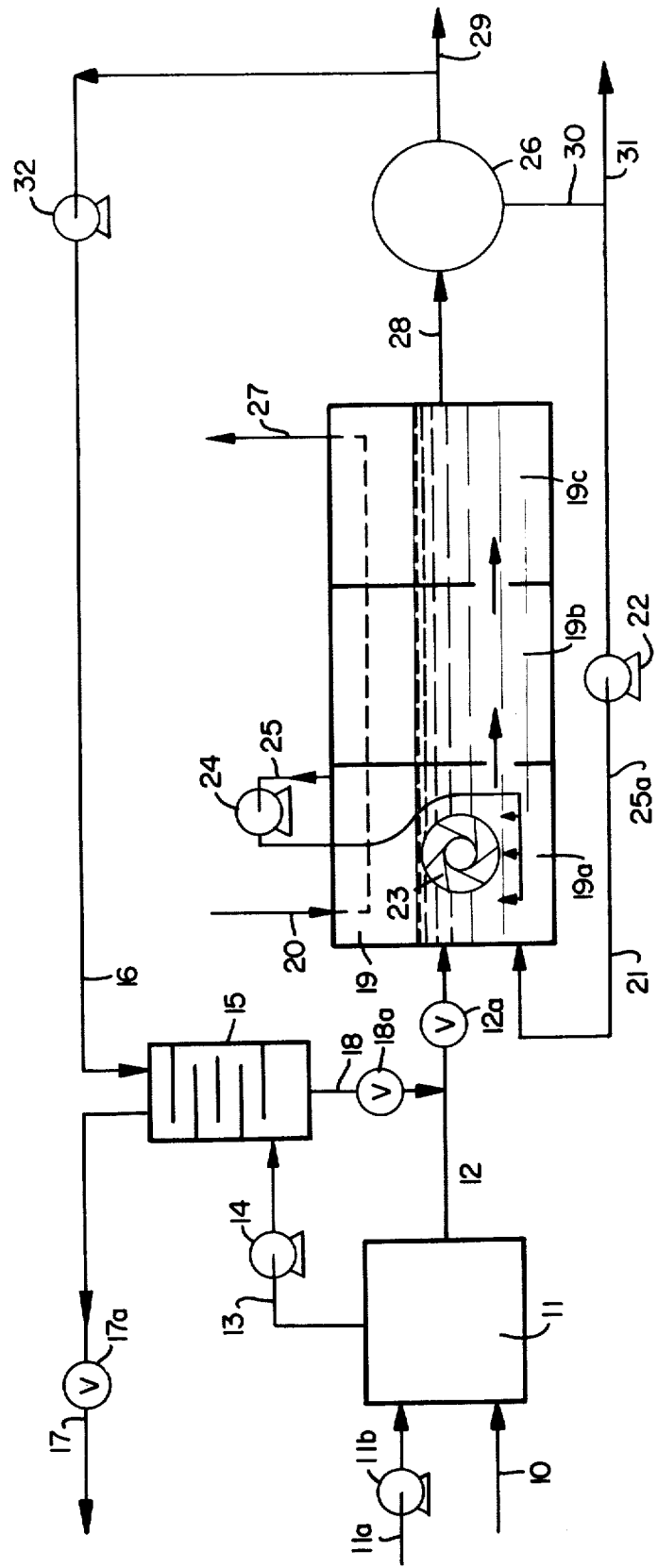
FIG. 1 is a schematic flowsheet of apparatus suitable for practicing one embodiment of this method wherein a minor part of purified water from the oxygenated liquid separation is recycled as the $H_2S$-low water for $H_2S$ absorption.

U.S. Pat. No. 3,547,812 issued Dec. 15, 1970 to J. R. McWhirter describes an improved system for biochemically treating BOD-containing water by at least 60% (by volume) oxygen gas in contact with active biomass (activated sludge) to form liquor. The mixing is continued while simultaneously maintaining: (a) the oxygen feed gas to mixing plus gas-liquor contact energy ratio at 0.03–0.40 lb. moles oxygen per horsepower hour of energy supplied, (b) the aeration gas above the liquor at oxygen partial pressure of at least 300 mm. Hg but below 80% oxygen (by volume) while consuming at least 50% (by volume) of the feed gas oxygen in the liquor, (c) the dissolved oxygen concentration of the liquor at below 70% of saturation with respect to the oxygen in the aeration gas but above about 2 ppm. and (d) continuously recirculating one of the aeration gas and liquor fluids in intimate contact with the other of the fluids in the aeration zone. Oxygenated liquor is thereafter withdrawn from the aeration zone and preferably separated into cleaned effluent water and activated sludge, a portion of the latter being recycled to the aeration zone.

U.S. Pat. No. 3,547,815 issued Dec. 15, 1970 to J. R. McWhirter describes another improved system for biochemically treating BOD-containing water by at least 50% (by volume) oxygen gas in contact with active biomass. In this McWhirter gas-staged system, the oxygen feed and other fluids are mixed and one fluid is simultaneously continuously recirculated in a first is simultaneously continuously recirculated in a first gaseous oxygen stage to form first oxygenated liquor and first unconsumed oxygen-containing gas. The latter is discharged from the first stage and mixed with aqueous liquid-solid in a second stage and one of the fluids is also continuously recirculated against the other fluids in the second stage. Although only two gas stages are essential, it is often desirable to provide additional gas stages and operate same in a manner analogous to the first two stages. If the system is within an enclosed chamber, it is also preferred to flow the oxygenated liquor from stage-to-stage cocurrent (in the same direction as) the gas staging.

Both of these oxygen biochemical treatment systems offer important advantages as compared with conventional air aeration of wastewater, for removal of carbon food. The advantages for example include smaller aeration equipment, lower power costs, lower capital investment, lower sludge handling costs and less land space.

In view of the substantial $H_2S$ solubility in water it may seem logical to introduce both $H_2S$-containing gas and liquid phases of aqueous BOD-containing waste fluid into the McWhirter-type enclosed oxygen aeration zone for $H_2S$ removal therein. However, this zone requires a relatively high oxygen partial pressure in the enclosed gas space to maintain sufficient driving force for oxygen transfer into the liquor. Unfortunately $H_2S$-laden gas to be treated is not only substantial in volume (relative to the quantity of oxygen feed gas needed for aeration of a given waste water quantity) but also contains substantially the nitrogen content of air for example about 80% $N_2$ by volume. Also, McWhirter-type oxygen aeration requires recirculation of one fluid against the other within the zone with venting of only a small fraction of the oxygen-depleted aeration gas — typically about one two-hundredth the volume vented in air aeration. Direct introduction of the $H_2S$-containing gases in the oxygen aeration zone would then result in an aeration gas of substantial $N_2$ concentration. For example, if the $H_2S$-containing gas enters at a rate of 100 volumes per unit time and the oxygen feed rate is 240 volumes per unit time (100% $O_2$ of volume) then the oxygen concentration in the aeration zone would be only about 24 volume % assuming 90% $O_2$ utilization in the waste water treatment.

This invention overcomes the problem by first separating the $H_2S$-containing waste fluid into liquid and gas phases and then dissolving the $H_2S$ from the gas phase into $H_2S$-low water. By providing adequate gas-liquid contact, the high solubility of $H_2S$ in water may be used advantageously without impairing the performance of the enclosed oxygen aeration zone. By providing intimate gas-liquid contact between the waste gas and an aqueous stream, the $H_2S$ can readily be absorbed into the water and result in a gas phase effluent essentially free of hydrogen sulfide. For example, based on a countercurrent flow tray column gas-liquid contactor with five theoretical trays and 70 ppm. $H_2S$-containing air, a gas phase reduction for $H_2S$ of 10,000-fold is readily attained so that the $H_2S$ in the processed gas is much lower than the detectable odor level of about 1 ppm.

The $H_2S$-containing water is then passed to an enclosed aeration zone wherein organic pollutants are also removed from the waste water. Here the dissolved sulfides are oxidized by the dissolved oxygen in the water in the presence of activated sludge. Sulfide oxidation is dependent on maintaining aerobic conditions with at least 2 mm. dissolved oxygen concentration needed to insure substantially complete biochemical and chemical oxidation of the $H_2S$ and organic constituents of the water to be treated. This characteristic represents a substantial advantage compared to air aeration because such relatively high DO cannot be maintained in an open zone except by expending inordinately large quantities of power. As a result of the DO level of at least 2 ppm. in the enclosed oxygen aeration zone, the required liquid contact time to achieve substantially complete sulfide oxidation is relatively short and comparable with the liquid contact time needed for biochemical oxidation of the carbon food.

It should also be noted that if one employed the prior art open air aeration zone, the $H_2S$ would be stripped from the entering water and thereby contaminate the atmosphere.

Referring more specifically the the drawings and FIG. 1, the aqueous BOD-containing waste fluid (both liquid and gas) also containing $H_2S$ is introduced through conduit 10 to means 11 for separating the gas and liquid into wastewater for discharge in conduit 12 and waste gas for discharge in overhead conduit 13. Means 11 may for example comprise a covered vessel with overhead gas space, as part of a primary treatment zone for the waste fluid. An externally supplied gas stream as for example air may be introduced to the overhead space of means 11 through conduit 11a with pump 11b therein, or introduced to the bottom for bubbling through the water as in an air aerated grit chamber. The purpose of this gas stream is to suppress the $H_2S$ concentration in the overhead space so that people may enter without toxic danger. The $H_2S$-containing gas is flowed through conduit 13 by fan or blower 14 to the base of liquid-gas contactor 15. At the same time, $H_2S$-low water is introduced through conduit 16 at the upper end of contactor 15 for downward flow therethrough in intimate contact with the rising $H_2S$-containing gas, the latter being driven by fan or blower 14. Liquid-gas contactor 15 may for example be a packed column, a wetted wall column, or provided with spaced trays.

It is preferable to use as the $H_2S$-low water, $H_2O$ containing substantially no dissolved hydrogen sulfide as the $H_2S$ absorbing stream, so as to maximize the driving force and the rate of mass transfer for the absorption. However, as used herein the "$H_2S$-low water" may contain up to about 0.1 ppm. $H_2S$. A convenient source of $H_2S$-low water is that purified in the instant method, as discussed hereinafter.

The gas-to-liquid $H_2S$ absorption yields a gas effluent substantially free of hydrogen sulfide, which may be released to the atmosphere through conduit 17 by control valve 17a without adversely affecting air quality. The liquid effluent from contactor 15 is discharged through conduit 18 with control valve 18a either directly into enclosed aeration zone 19, or first mixed with wastewater in conduit 12 and fed to zone 19 as a combined stream through control valve 12a. The $H_2S$-containing water in conduit 18 (and the $H_2S$-low water in conduit 16) comprises about 1–20% by volume of the water entering enclosed aeration zone 19 and preferably 4–10 volume percent. Quantities of $H_2S$-low water greater than 20% of the feed flow are unnecessary for $H_2S$ removal in contactor 15 and would represent an unnecessary expense for equipment and/or operation. Even though the $H_2S$-low water comprises a portion of the liquid normally carried through the waste water system, the use of excessive flow of such water through the contactor 15 will increase its size needlessly and will add pumping and/or mixing costs during operation. Examples of $H_2S$-low liquid which may be normally carried through the system are (a) any separate stream of waste water received at the treatment plant in $H_2S$-low condition, and (b) the activated sludge stream which is recycled from the clarifier to the aeration zone. If the $H_2S$-low water is a stream recycled internally of the system solely for $H_2S$ control purposes, then quantities greater than 20% of the feed would impose excessive hydraulic burden on the waste water aeration zone, thereby increasing both the size of tankage and the power expended for mixing and mass transfer.

In preferred practice the $H_2S$-low water comprises clarified effluent from the system and in such case the added hydraulic burden is also imposed on clarification equipment. The use of excessive clarified effluent in contactor 15 also dilutes the mixed liquor undergoing aeration. When accompanied by reduced retention time in the aeration zone a more dilute mixed liquor results in lower food/biomass ratio, which in turn increases excess sludge production and may impair effluent quality. For the foregoing reasons, it is preferred to restrict the flow of $H_2S$-low water through contactor 15 to a rate not greater than 10% of the feed flow.

The quantity of $H_2S$-low water introduced through contactor 15 should be sufficient to provide a liquid/gas flow ratio in the contactor of at least 545 lb moles liquid/lb mole gas. With typical quantities of $H_2S$-containing gas encountered in process steps where $H_2S$ is evolved, (e.g., 70 ppm $H_2S$ in gas stream 13) such L/V can be obtained with a liquid rate not exceeding 1% of the waste water feed flow. If the liquid/gas flow ratio is less than this value then the required high degree of $H_2S$ removal from the gas cannot be achieved even with an infinite number of theoretical plates or stages in the contactor. It is preferred to employ a liquid/gas flow ratio of at least 1,500 corresponding to a small number of required theoretical plates not exceeding ten. This flow ratio can normally be achieved with a $H_2S$-low liquid rate through the contactor not exceeding 3% of the waste water feed rate.

In light of the foregoing requirements, effective $H_2S$ control cannot be achieved by attempting to apply this invention in an air-aerated waste treatment system as hereinafter illustrated. If the $H_2S$-containing gas stream 13 were injected into the mixed liquor of an air-aerated system along with the large quantity of air required for oxygen dissolution and mixing, then at best the effectiveness of the contacting step could approach only one theortical plate and the resultant L/V would be on the order of only 140. This is far below the minimum value of 545 required even with a very large number of theoretical plates. Even if the liquid were low in $H_2S$ (which it is not), only about 25% of the applied $H_2S$ could be removed from the gas. It would also be ineffective to introduce the $H_2S$-containing liquid stream 18 into an air-aerated waste water treatment zone. The large quantity of $H_2S$-free air bubbled through the $H_2S$-containing mixed liquor would strip an appreciable fraction of the dissolved $H_2S$ from the solution, and the "spent" air released to the atmosphere would not be odor-free.

At least 50% by volume oxygen gas is introduced to enclosed aeration zone 19 through conduit 20, and activated sludge is also introduced to zone 19 through conduit 21 having pump 22 therein. The aforementioned streams are intimately mixed in zone 19 by mechanical agitation means 23. The latter may comprise motor-driven impellers located near the liquor surface or submerged below the surface, and the oxygen gas may be introduced through conduit 20 either above or below the liquor surface. Such apparatus is well-know to those skilled in the art and should be selected to achieve high contact area between the fluids with minimal work expenditure. If the oxygen gas is sparged into the liquor, the bubbles should be small so that their total surface area is large and their buoyancy is low. Dissolution of oxygen is also aided by submerging the gas dispensing means to a depth in the liquid where the hydrostatic effect is significant.

Means are provided to continuously recirculate one fluid against the other fluids in enclosed aeration zone 19. For example pump 24 joined to the gas space by conduit 25 recirculates aeration gas to the lower portion of the zone for release as small gas bubbles through sparger 25a. Aerating devices are commonly rated by the so-called "air standard transfer efficiency" which identifies the capability of the device to dissolve oxygen from air into zero DO tap water at 1 atmosphere pressure and 20° C. Suitable devices are those which have an air standard transfer efficiency of at least 1.5 lb. $O_2$ per HP-hr. For these purposes the power used in rating the device is the total power consumed both for agitating the liquor and for gas-liquor contacting by recirculation.

Although enclosed aeration zone 19 may comprise a single chamber it preferably comprises a multiplicity of sub-zones or stages 19a, 19b and 19c, each having mechanical agitation means 23 and fluid recirculation means 24 (but for simplicity not illustrated in each stage). The unconsumed oxygen-containing gas from each aeration stage is preferably discharged therefrom and introduced to the next succeeding stage as the aeration gas (illustrated by a dotted line). Similarly, oxygenated liquor from each stage is discharged and preferably introduced to the next succeeding stage in cocurrent flow relation with the unconsumed oxygen-containing gas for mixing therewith and recirculation of one fluid against the other fluids. Stage-to-stage oxygenated liquor flow is illustrated by solid arrows extending through the stage partitions. Cocurrent gas-liquor flow through a multiplicity of aeration stages is preferred to satisfy the inherent variation in BOD of the water to be treated and of the succeeding partially oxygenated liquor. The feed gas representing the highest purity oxygen is contacted with the feed water in the first stage. Accordingly, the first or feed gas stage has the highest oxygen partial pressure and thus the highest oxygen transfer potential. Therefore the high oxygen demand in this stage can be supplied without excessive power consumption. Cocurrent flow is also beneficial and preferred in the present invention because the aeration gas ultimately vented to the atmosphere is then in equilibrium with liquid of lowest $H_2S$ content and is therefore depleted of $H_2S$ to maximum degree.

Although FIG. 1 illustrates the introduction of $H_2S$-containing water through conduit 18 into the first stage 19a of aeration zone 19, the former could alternatively be introduced to a subsequent aeration stage as for example 19b but preferably to a stage prior to stage 19c.

The oxygen gas is introduced through conduit 20 to enclosed aeration zone 19 at sufficient rate to maintain the dissolved oxygen content of the mixed liquor above the 2mg/l. Oxygen is consumed at a rapid rate for chemical oxidation of $H_2S$ and biochemical oxidation of BOD, and with conventional air aeration the dissolved oxygen level in the aeration zone drops to near zero and cannot be maintained at levels suitable for aerobic micro-organisms. This is overcome in part by using an aerating gas comprising at least 50 percent oxygen and preferably at least 90 percent oxygen. Also, the gas must be mixed with the returned activated sludge and BOD-containing water in an efficient manner to create a large interfacial area with minimal work on the fluids. Another feature of the process contributing to the dissolved oxygen level control is the aforementioned continuous recirculation of one fluid against the other fluids. The dissolved oxygen content of the aeration zone 19 preferably should not exceed about 10 ppm. because higher DO represents unnecessary expenditure of power and oxygen and the greater work expended for dissolution would tend to cause excessive attrition of the bacterial floc, reducing its agglomerate size and impairing its settling properties. Stated otherwise, the floc particles would be so small that the effluent becomes turbid and unsuitable for discharge into receiving waters.

In the activated sludge process, the recycled sludge consists essentially of flocculent agglomerates of aerobic organisms which have the ability, in the presence of sufficient dissolved oxygen, to first absorb, then assimilate and oxidize the organic material of the feed water. This adsorption-assimilation sequence occurs in the aeration zone of the present process, and in the FIG. 1 embodiment the sequence is substantially completed upstream of separation zone 26. The liquid-solid contact time in aeration zone 19 for organic food adsorption-assimilation is between 30 minutes and 24 hours. This time varies depending upon the strength (BOD content) of the waste water, the type of pollutent, solids level in aeration and temperature. A maximum retention period of 24 hours will usually provide adequate time to remove BOD from effluent, to activate the sludge, and perform a reasonable degree of auto-oxidation if desired. Where several aeration stages are employed, the retention period in the aeration zone refers to the total time the biomass solids (the total bacteria present) together with the BOD of the feed water are held in all aeration stages. In the FIG. 1 embodiment where the aeration zone 19 is entirely upstream of the clarifier 26, the contact time is calculated as the total liquid volume of stages 19a, 19b and 19c divided by the volumetric flow rate of combined BOD-containing feed water and activated sludge recycle. In the FIG. 2 embodiment wherein the aeration zone 10 is partly upstream and partly downstream clarifier 18 (as discussed hereinafter in detail), the contact time for a given quantity of BOD plus biomass is calculated as the sum of the contact times upstream and downstream of the intermediate clarifier. The upstream contact time is calculated by dividing the upstream liquid volume of stages 19a and 19b by the volumetric flow rate of combined BOD-containing feed water and activated sludge recycle. The downstream contact time is calculated by dividing the downstream liquid volume of stage 19c by the sludge discharge rate from the clarifier flowing to stage 19c.

If it is desired to extend oxygen treatment on the biomass beyond the period required to assimilate and oxidize the wastewater's BOD, then the fraction of the organisms of the sludge which themselves are destroyed and consumed by biological oxidation can become significant. Carrying auto-oxidation to an extreme in the aeration zone should be avoided because it reduces the activity of the biomass to be recycled in the return sludge and impairs its settlability. Moreover, retaining the treated biomass under long term airation is expensive because aeration basins become prohibitively large and power consumption is greatly increased.

If the sole objective is to assimilate and oxidize the BOD of the influent BOD-containing water, then a relatively short contact time will suffice.

Contact times not exceeding 180 minutes are usually satisfactory in multiple staged-cocurrent flow oxygen aerated systems treating relatively low strength municipal waste liquids having up to about 300 mg/l. BOD. For higher strength wastes as for example those discharged from petrochemical plants, longer contact times on the order of 5–12 hours are necessary to yield an effluent of comparable purity. The aforedescribed liquor contact times in enclosed oxygen aeration zone 19 are much shorter than perhaps one third as long a comparable basis.

In the practice of this invention, it is preferred to maintain high suspended solids concentration in the aeration zone. The BOD-containing water-activated sludge volatile suspended solids content is preferably at least 3,000 mg/l. One reason for this preference is that the solids concentration in the aeration zone affects the rates of the biochemical reactions and possibly also the sulfide oxidation occurring in the method. In the treatment of municipal sewage, the suspended solids comprise: (1) biologically oxidizable organic material, (2) non-biologically oxidizable organic material, and (3) non-oxidizable non-organic material. The non-organic material such as sand and grit, and the non-biologically oxidizable material such as polyethylene particles or paper are undesirable but unavoidable components of the BOD-containing water, e.g., sewage, entering the aeration zone. Normally relatively large particles, e.g., wood chips, are usually removed in a pretreatment step.

The major fraction of the total solids in the mixed liquor, e.g., 70 percent thereof, consists of bacterial floc (biomass) in the activated sludge recirculated from the clarifier to the aeration zone. The higher the concentration of bacteria, the more rapid will be the adsorption and assimilation of BOD, assuming other requirements are also met such as dissolved oxygen supply.

Returning now to FIG. 1, unconsumed oxygen-containing gas is discharged into conduit 27 from aeration zone 19, and in particular from the final subzone 19c if gas staging is employed. Also the mixed oxygenated liquor is discharged from aeration zone 19 and passed through conduit 28 to the aforementioned clarifier 26 for separation into supernatent liquid and activated sludge. The former is drawn off through conduit 29 and the activated sludge is discharged from the lower end through conduit 30. At least 85 percent by weight and preferably at least 95 percent of the activated sludge separated in clarifier 26 is returned to aeration zone 19 as the source of active bacteria. Any balance of unreturned sludge is discarded through conduit 31. Where several aeration stages are provided the activated sludge is recycled through conduit 21 by pump 22 to the first stage 19a where the oxygen gas and the BOD and $H_2S$-containing water are also introduced. The activated sludge preferably has 12,000 to 50,000 mg/l. total suspended solids content (TSS) and is preferably recycled to the aeration zone at flow rate relative to the BOD and $H_2S$-containing water such that the recycling sludge to BOD and $H_2S$-containing water volume ratio is 0.1 to 0.5.

A minor fraction of the purified water in conduit 29 is diverted through branch conduit 16 and flowed by pump 31 to the upper end of liquid-gas con-tactor 15 as the aforementioned $H_2S$-low water. The clarifier effluent is the preferred source of $H_2S$-low water as the former is free of solids which could adversely affect the $H_2S$ absorption in column 15. Although the latter has been described and illustrated as vertically oriented, it may alternatively be a horizontal multi-staged contactor with gas and liquid flow therethrough in countercurrent direction.

It is known that pH exerts a strong effect on the chemical form of sulfide in water. A relatively high pH characteristic of air-aerated waste water treatment is said to shift the following reaction to the left:

It is reported for example that at 25°C and at pH of 8, only 8.3% of aqueous sulfide is in the ($H_2S$) form while 91.7% is in the ($HS^-$) form. At the same temperature and at pH of 6, 90.1% is in the ($H_2S$) form and only 9.9% is in the ($HS^-$) form. It is further reported that the ionic species ($HS^-$) is not readily oxidized. Moreover while dissolved sulfide in the form of ($H_2S$) exerts appreciable vapor pressure, the ionic form does not, and $H_2S$ is eleven times more soluble at pH of 8 than at pH of 6. Therefore, high pH should tend to retain the sulfide in the mixed liquor and leave the gas relatively $H_2S$ free.

At low pH as characteristic of oxygen treatment of sewage in covered reactors, the foregoing reaction is shifted the the right favoring the ($H_2S$) form. The ($H_2S$) form is more readily oxidizable with dissolved oxygen but it is also more readily stripable from solution. Thus low pH tends to shift sulfide distribution within the system toward gas phase. In the present invention this is favorable to the production of $H_2S$-low water suitable for use in contactor 15. However, such shift in sulfide distribution is unfavorable to the production of odor-free, substantial $H_2S$-free vent gas from the waste water oxygenation zone. Morever the low pH of the treated water reduces its capability to remove $H_2S$ from the gas in contactor 15 and is unfavorable to the purification of such gas to an odor-free condition.

Despite the seeming disadvantages enumerated above it has been found that $H_2S$ is essentially completely removed from the gas phase of the covered oxygen-aerated contact zone and is essentially completely oxidized in the liquid phase. It is concluded that the rate of $H_2S$ oxidation is extremely rapid in the process of this invention despite relatively low concentration of the ($H_2S$) species in the liquid. This is surprising in view of low $H_2S$ oxidation rates in pure water which have been reported in the literature. For example, a sulfide half-life of 60–70 hours at 20°C has been reported in Black Sea water by Skopintsev, B. A., Karpov, A. V. and Vershinina, D. A., Tr. Morsk. Gidrofiz Inst. Aka. Nauk SSR, 16, 89–111 (1959). Such half-life far exceeds the 1 to 2 hours oxygen-aeration time typical of the instant invention. The reasons for the high $H_2S$ oxidation rate are not completely understood, but are believed to include an ample supply of dissolved oxygen available at a DO level of at least 2 mg/l., and also a relatively high concentration of catalytic materials resident in the more concentrated biomass of the oxygen-aerated process, preferably at least 4,000 mg/l MLSS. Recirculation of one fluid against the other fluid in the oxygenation zone for repetitive contact of gas and liquid is also important in order to rewash $H_2S$ from the gas into the liquid as rapidly as the $H_2S$ is oxidized in solution.

The mechanism by which $H_2S$ oxidation may be promoted by high solids concentrations in the oxygenation zone has been studied but is yet unresolved. It is not inconceivable that $H_2S$ oxidation may proceed biochemically at least in part, so that certain species of the biomass may be direct contributors. To the extent that catalytic materials are absorbed on or otherwise captured by the floculent solids, the concentration of such catalysts would increase at higher solids levels. It is reported that $H_2S$ oxidation is catalyzed by the presence of transition metal ions of Mn, Fe, Co, Ni, Cu, Ca, and Mg and by the presence of certain organic compounds. Many of the foregoing substances are often found in the industrial component of waste water.

The substantially complete removal of $H_2S$ from both gas and liquid phases within a covered oxygen aerated wastewater treatment zone has been confirmed in pilot plant tests. A pilot plant was used comprising four sub-zones arranged for cocurrent gas-liquor flow in the manner of the aforementioned McWhirter U.S. Pat. No. 3,547,815 (FIG. 4) with a clarifier joining the liquor terminal portion. Each sub-zone had a volume of about 400 U.S. gallons and dimensions of 41 inches long × 38 inches wide by 78 inches high. The total volume of the enclosed aeration zone was 16,000 U.S. gallons and the liquor depth during the tests was about 5 ft. Each sub-zone was equipped with an oxygen gas sparger-impeller, gas and liquor mixing unit driven by an electric motor. The sparger consisted of rotating arms equipped with small diameter orifices through which the oxygen gas was recirculated, the impeller and sparger being mounted on a common shaft for rotation.

A municipal wastewater stream was continuously processed through the pilot plant containing approximately 190 mg/l. total biochemical oxygen demand ($BOD_5$), 200 mg/l. total suspended solids (MLSS), and 9 mg/l. dissolved hydrogen sulfide. This sewage was processed in the enclosed aeration zone for a liquor contact time of approximately 120 minutes under average conditions (across the sub-zones) of approximately 6,000 mg/l. total suspended solids and 4,800 mg/l. volatile suspended solids (MLVSS) in the mixed liquor. The effluent water from the clarifier and the waste gas from the final sub-zone possessed no odor and therefore contained essentially no sulfide of measurable concentration. (This is because the odor of hydrogen sulfide is readily detectable in gas phase concentrations of less than 1 ppm. and the corresponding liquid phase equilibrium concentration is 3 parts per billion.)

Figure 2:
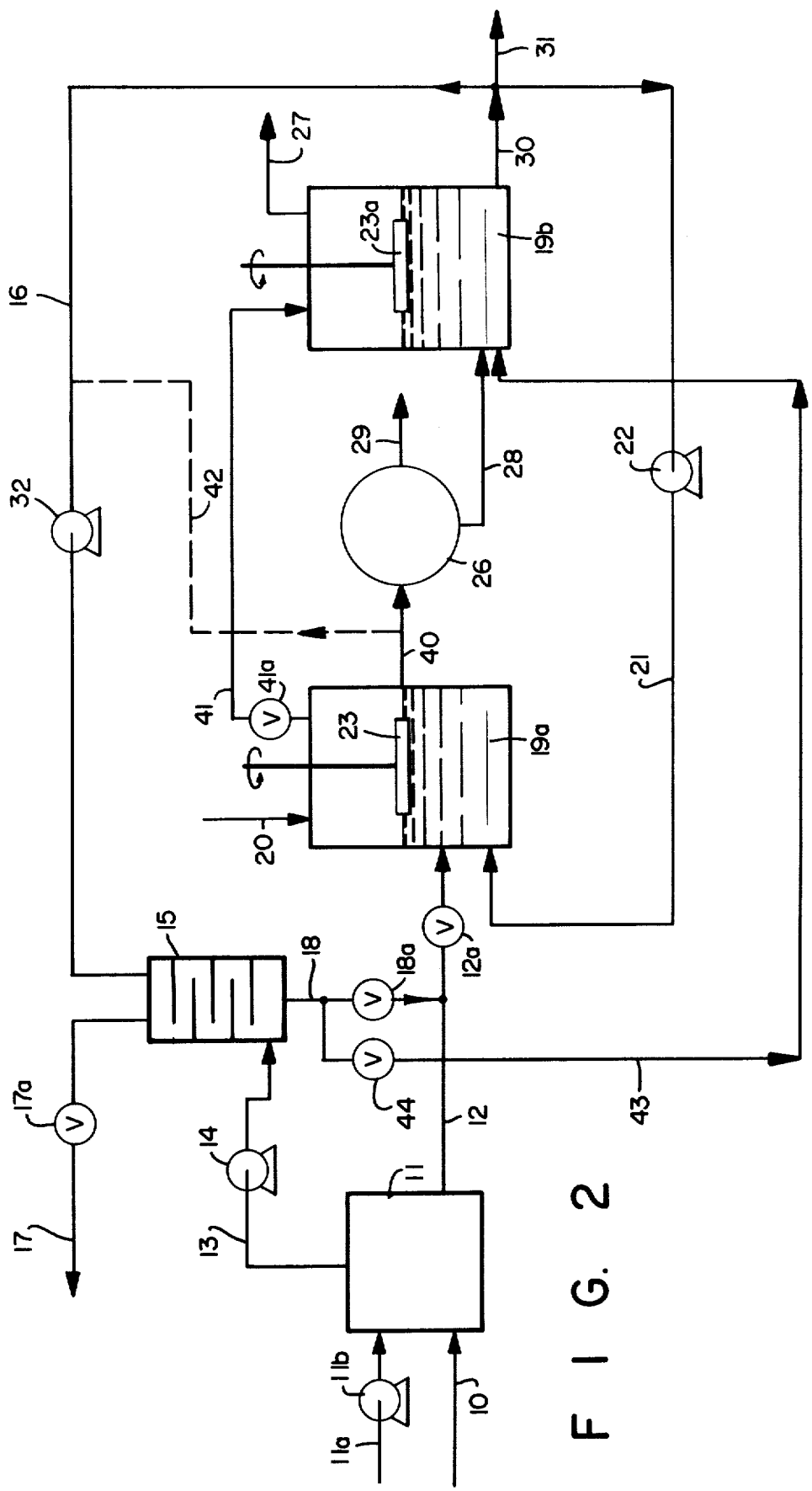
FIG. 2 is a schematic flowsheet of apparatus suitable for practicing an alternative embodiment of this invention wherein the $H_2S$ - containing water is introduced to the stabilization part of the enclosed aeration zone and a minor part of the oxygenated liquor and/or activated sludge is recycled as the $H_2S$-low water for $H_2S$ absorption.

The FIG. 2 alternative embodiment differs from FIG. 1 only in certain respects hereinafter described in detail. Aeration zone 19 is divided into two stages 19a and 19b separated by clarifier 26. The advantage of this arrangement (generally referred to as "contact stabilization") is that only the reduced volume stream of concentrated activated sludge is processed in second aeration stage 19b downstream clarifier 26. More specifically, the BOD-containing water is first mixed in the first aeration stage 19a with oxygen gas and recycled activated sludge for sufficient time to absorb and assimulate the BOD onto and into the sludge floc, thereby producing a partially oxygenated liquor from which a purified water effluent may be separated by clarification This period may be relatively short, e.g., 15 to 45 minutes, if only the contact portion of the aeration step is performed before clarification. The partially oxygenated liquor is discharged from first aeration stage 19a through conduit 40 to clarifier 26 where the supernatant effluent water is separated and withdrawn in conduit 29.

The concentrated activated sludge is discharged from clarifier 26 through conduit 28 and to the extent that stabilization has been performed upstream of the clarifier, the sludge will be at least partially BOD-depleted. The sludge is then passed through conduit 28 to second aeration stage 19b for further mixing with oxygen gas. This gas is preferably supplied in the form of oxygen-depleted aeration gas vented from first aeration stage 19a through conduit 41 and control valve 41a therein for introduction to second aeration stage 19b. The further aerated sludge which for example may be further stabilized and partially auto-oxidized, is discharged from second aeration stage 19b through conduit 30.

It will be noted that mixing means 23 and 23a in first and second aeration stages 19a and 10b respectively, are rotatable surface impellers. They throw massive sheets of liquor into the enclosed gas space above the liquor level and thereby also perform the fluid recirculation function.

The gas-liquid separation of the BOD and $H_2S$-containing waste fluid is performed by means 11 in the same manner as in FIG. 1. Gas-to-liquid transfer of $H_2S$ is effected in contactor 15, but the $H_2S$-low water introduced to the top end thereof through conduit 16 is derived from the further — oxygenated sludge discharged from second aeration (stabilization) stage 19b. Tthis stream has essentially zero concentration of $H_2S$ so that a maximum driving force exists for the interphase fluid transfer. Since gas-liquid contactor 15 may be adversely affected by solids which are of course present in the further-oxygenated sludge, the effluent water in conduit 29 is the preferred source of $H_2S$-low water for such gas-liquid contact. As still another alternative, and if first aeration stage 19a is of sufficient duration to remove substantially all $H_2S$ from the water, the partially oxygenated liquor in conduit 40 (immediately upstream clarifier 26) may be used as the source of $H_2S$-low water for gas-liquid contactor 15. In this event, such liquor would be diverted through conduit 42 (shown as dotted line).

The $H_2S$ — containing water from contactor 15 in conduit 18 is directed through branch conduit 43 having control valve 44 therein to second aeration (stabilization) stage 19b for mixing with oxygen gas, activated sludge and chemical removal by oxidation. The advantage of this embodiment is that the high solids level in stage 19b relative to first stage 19a (perhaps five times that of the latter) promotes higher rate oxidation of $H_2S$. Another advantage is that the lower $H_2S$ removal requirement in first aeration stage 19a insures $H_2S$-free water discharge in conduit 29 from clarifier 26. Whereas FIG. 2 only shows single aeration stages 19a and 19b respectively upstream and downstream clarifier 26, in prefered practice for complete oxidation of $H_2S$, multiple stages would be employed in each instance.

Although certain embodiments have been described in detail, it will be appreciated that other embodiments are contemplated and that modifications of the disclosed features are within the scope of the invention.

I claim:

1. A method for removing $H_2S$ from both gas and liquid phases of aqueous BOD-containing waste fluid comprising the steps of:
   a. separating the $H_2S$-containing waste fluid into wastewater and waste gas;
   b. contacting the separated $H_2S$-containing waste gas from (a) with $H_2S$-low water in a liquid/gas flow ratio of at least 545 lb. moles liquid/lb. mole gas, absorbing said $H_2S$ in the water and discharging the $H_2S$-depleted waste gas;
   c. mixing said wastewater from (a) and $H_2S$-containing water from (b) with activated sludge and at least 50% by volume oxygen gas in sufficient quantity to provide dissolved oxygen concentration of at least 2 ppm. in an enclosed aeration zone and simultaneously recirculating one fluid against the other fluid for sufficient duration to chemically remove the $H_2S$ by oxidation and biochemically oxidize the BOD thereby forming oxygenated liquor;
   d. separating the oxygen liquor into activated sludge and purified water; and
   e. recycling at least part of said activated sludge to said enclosed aeration zone of (c).

2. A method according to claim 1 wherein said aqueous waste fluid is sewer gas and sewer water.

3. A method according to claim 1 wherein a minor part of said purified water from (d) is recycled as said $H_2S$-low water for the contacting of (b).

4. A method according to claim 3 wherein said $H_2S$-low water comprises 1–20% by volume of the total water entering said enclosed aeration zone.

5. A method according to claim 3 wherein said $H_2S$-low water comprises 4–10% by volume of the total water entering said enclosed aeration zone.

6. A method according to claim 1 wherein a minor part of said oxygenated liquor from (c) is recycled as said $H_2S$-low water for the contacting of (b).

7. A method according to claim 1 wherein a minor part of said activated sludge from (d) is recycled as said $H_2S$-low water for the contacting of (b).

8. A method according to claim 1 wherein said wastewater contains a catalytic quantity of at least one transition metal ion.

9. A method according to claim 1 wherein said enclosed aeration zone comprises a first contact sub-zone and a second stabilization sub-zone, with partially oxygenated liquor being discharged from said first contact sub-zone, BOD-depleted water separated from said partially oxygenated liquor to form partially BOD-depleted sludge which is passed to second stabilization sub-zone, and said activated sludge being recycled from said second stabilization sub-zone to said first contact sub-zone.

10. A method according to claim 1 wherein the total suspended solids concentration (MLSS) in said enclosed aeration zone is at least 4,000 mg/l.

11. A method according to claim 1 wherein the liquid/gas flow ratio in the step (b) contacting is at least 1,500 lb. moles liquid/lb. mole gas.

12. A method according to claim 1 wherein said enclosed aeration zone comprises a multiplicity of sub-zones wherein wastewater, $H_2S$-containing water and oxygen feed gas are mixed and one fluid is recirculated against the other fluids in a first sub-zone and partially oxygenated-liquor and partially oxygen-depleted gas are cocurrently flowed therefrom to at least a second sub-zone for further mixing and one fluid recirculation against the other fluids therein, and said oxygenated liquor and oxygen-depleted gas are discharged from the final sub-zone.

13. A method for removing $H_2S$ from both gas and liquid phases of aqueous BOD-containing waste fluid comprising the steps of:

a. separating the $H_2S$-containing waste fluid into wastewater and waste gas;

b. contacting the separated $H_2S$-containing waste gas from (a) with $H_2S$-low water in a liquid/gas flow ratio of at least 1,500 lb. moles liquid/lb. mole gas, absorbing said $H_2S$ in the water and discharging the $H_2S$-depleted waste gas;

c. mixing said wastewater from (a) and $H_2S$-containing water from (b) in relative proportions such that said $H_2S$-containing water comprises 4–10% by volume of the total water and with activated sludge and at least 50% by volume oxygen gas in sufficient quantity to provide dissolved oxygen concentration of at least 2 ppm. and total suspended solids concentration (MLSS) of at least 4,000 mg/l in an enclosed aeration zone and simultaneously recirculating one fluid against the other fluid for sufficient duration to chemically remove the $H_2S$ by oxidation and biochemically oxidize the BOD thereby forming oxygenated liquor, said aeration zone comprising a multiplicity of sub-zones wherein wastewater, $H_2S$-containing water and oxygen feed gas are mixed and one fluid is recirculated against the other fluids in a first sub-zone and partially oxygenated-liquor and partially oxygen-depleted gas are separately cocurrently flowed therefrom to at least a second sub-zone for further mixing and one fluid recirculation against the other fluids therein, and said oxygenated-liquor and oxygen-depleted gas are separately discharged from the final sub-zone;

d. separating the oxygenated liquor into activated sludge and purified water;

e. recycling at least part of said activated sludge to said enclosed aeration zone of (c); and f. recycling a minor part of said purified water as said $H_2S$-low water.

* * * * *